United States Patent
Yufuku et al.

(10) Patent No.: US 8,198,824 B2
(45) Date of Patent: Jun. 12, 2012

(54) ELECTRONIC BALLAST FOR RESTARTING HIGH-PRESSURE DISCHARGE LAMPS IN VARIOUS STATES OF OPERATION

(75) Inventors: Akira Yufuku, Hyogo (JP); Takeshi Kamoi, Kyoto (JP)

(73) Assignee: Panasonic Corporation, Osaka (JP)

( * ) Notice: Subject to any disclaimer, the term of this patent is extended or adjusted under 35 U.S.C. 154(b) by 382 days.

(21) Appl. No.: 12/625,295

(22) Filed: Nov. 24, 2009

(65) Prior Publication Data
US 2010/0156312 A1    Jun. 24, 2010

(30) Foreign Application Priority Data
Nov. 25, 2008    (JP) .................................. 2008-300154

(51) Int. Cl.
*G05F 1/00* (2006.01)

(52) U.S. Cl. ........ 315/291; 315/247; 315/276; 315/224; 315/307

(58) Field of Classification Search ................ 315/291, 315/247, 246, 224, 225, 276–287, 307–311
See application file for complete search history.

(56) References Cited

U.S. PATENT DOCUMENTS
2006/0061200 A1 * 3/2006 Liao .............................. 297/468
2011/0074311 A1 * 3/2011 Kumagai et al. ............... 315/291

FOREIGN PATENT DOCUMENTS
| JP | 4272692 | 9/1992 |
| JP | 1994260289 | 9/1994 |
| JP | 2005285434 | 10/2005 |

* cited by examiner

*Primary Examiner* — Tuyet Thi Vo
(74) *Attorney, Agent, or Firm* — Waddey & Patterson, P.C.; Mark J. Patterson; Gary L. Montle

(57) ABSTRACT

A high-pressure discharge lamp ballast is provided for igniting and re-igniting a high-pressure discharge lamp in various states of operation. A power supply circuit is coupled to a power source and supplies AC power to the lamp. An ignition voltage generating circuit supplies a high-voltage ignition pulse for igniting the lamp. A pulse control circuit alternatively controls the ignition voltage generating circuit in a first control mode to provide the high-voltage ignition pulses for a first time period and in a second control mode to delay the high-voltage ignition pulses for a second time period. An abnormality detection circuit detects an abnormal lighting state of the lamp wherein a measured condition of the lamp corresponds to a predetermined condition. The pulse control circuit increases a ratio of the second time period relative to the first time period upon detection of an abnormal lighting state of the lamp by the abnormality detection circuit.

22 Claims, 14 Drawing Sheets

ELECTRONIC BALLAST FOR RESTARTING HIGH-PRESSURE DISCHARGE LAMPS IN VARIOUS STATES OF OPERATION

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japan Patent Application No. 2008-300154, filed Nov. 25, 2008.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates generally to ballasts for use in turning on a high-pressure discharge lamp. More particularly, the present invention relates to electronic ballasts configured to restart high-pressure discharge lamps in various states of operation.

Referring to FIG. 15, a high-pressure discharge lamp 2 as shown is conventionally known in the art and widely used as a light source for illumination with high luminance and high light output. The lamp 2 is brought into a stable lighting state (steady-state operation) by gradually increasing a temperature/pressure in an arc tube 21 from the time of ignition. If the high-pressure discharge lamp 2 after arriving in the steady state is then extinguished, an extremely high temperature/pressure in the arc tube 21 will cause a sharp rise of a dielectric breakdown voltage from a load voltage of approximately 100V as typically observed during steady state operation to several tens of kV in a short time period. Accordingly, it is necessary to apply a voltage of several tens of kV to the high-pressure discharge lamp in order to immediately re-ignite the high-pressure discharge lamp after it has been extinguished from a steady state.

However, applying the voltage of several tens of kV to the conventional high-pressure discharge lamp 2 as shown in FIG. 15 will result in a dielectric breakdown in the vicinity of an Edison base 20 without application of a voltage required for the arc tube 21. This phenomenon is particularly remarkable in a high-pressure discharge lamp 2 containing metal iodide, wherein a high voltage for ignition causes iodide to be scattered and deposited around a tube wall in the periphery of electrodes, thereby resulting in a path created along the tube wall and facilitating discharge along the discharge path.

Iodide is normally evaporated as the temperature/pressure in the arc tube 21 covered by an outer tube 22 is increased due to the continuous discharge, and the high-pressure discharge lamp 2 will move on to a steady state operation. However, if the high-pressure discharge lamp 2 is extinguished after having been lit for a short time period and prior to evaporation of the iodide, an unstable state is maintained in the arc tube 21 of the high-pressure discharge lamp 2 as the lamp attempts to gradually return to an initial state. Such an unstable state is accompanied by an increased ignition voltage in the high-pressure discharge lamp 2, wherein continuous glow discharge and application of the high voltage allow for ignition of the lamp. However, electrons which constitute discharge are consumed by iodide and the lighting is extinguished, thereby requiring a longer time period for ignition than that in usual ignition. In high pressure discharge lamp ballasts set to terminate an ignition operation in response to a continuous abnormal discharge, a high-pressure discharge lamp may accordingly be prevented from igniting. As a result, where the lamp is extinguished after having been lit for a short time period, such as for example to confirm the lighting operation upon installation, a phenomenon may be observed where re-ignition is prevented thereafter.

A conventional high-pressure discharge lamp is designed to have a particular dielectric breakdown voltage (for example, approximately 4 kV) in a sufficiently cooled state at the time of ignition. Therefore, if the high-pressure discharge lamp 2 is extinguished after having been lit for a short time period to reach a steady state, it is impossible for a conventional high pressure discharge lamp ballast to immediately re-ignite the lamp 2 even if the operation is immediately initiated, because the lamp 2 in this state now has a high dielectric breakdown voltage. When the temperature is lowered to cause a decrease in the dielectric breakdown voltage of the lamp to or below the level of a high ignition voltage that the ballast is designed to generate, the high-pressure discharge lamp 2 may then be restarted. It typically takes approximately 10 minutes for re-ignition, depending on the type of the high-pressure discharge lamp 2, a fixture structure and an installation state. During the re-ignition, the lamp ballast repeatedly generates an intermittent high voltage pulse for ignition. The reason for intermittently generating the high voltage pulse is to shorten a time period required to achieve re-ignition by setting a period to cool down the lamp 2.

In an example of a high pressure discharge lamp ballast as known in the art, the ballast is provided with a power supply circuit for supplying power to a high-pressure discharge lamp, an ignition voltage generating circuit adapted to supply a high voltage for ignition, a current sensor adapted to detect a current supplied to the high-pressure discharge lamp, and a monitoring control circuit for controlling the power supply circuit and the ignition voltage generating circuit by monitoring a lighting state of the lamp. In the lamp ballast of this example, the monitoring control circuit at ignition drives the ignition voltage generating circuit and monitors an ignition state by an output from the current sensor. In the case of an ignition failure, the monitoring control circuit repeats the sequence of driving the ignition voltage generating circuit and monitoring an ignition state using an output from the current sensor, until reaching a predetermined number of repetitions. If the ignition failures continue to reach the predetermined number of repetitions, the monitoring control circuit stops driving the ignition voltage generating circuit and stops power supply from the power supply circuit. It is therefore possible using the ballast of this example to reduce impairment and a danger of an electric shock such as caused by a high voltage generated for a long time period.

In another example of a high-pressure discharge lamp ballast as known in the art, generation of discharge in an outer tube is prevented if a high-pressure discharge lamp in steady state operation is turned off with an increased dielectric breakdown voltage. If the high voltage for ignition were to be applied thereto immediately, discharge might possibly occur in an outer shell of the arc tube, which may more easily allow discharge in the outer tube of the lamp. In the lamp ballast of this example, if the temperature of the high-pressure discharge lamp is increased and the lamp extinguished after having been turned on for a predetermined time period sufficient to achieve stable lighting, pulse application starts after a predetermined delay period. In contrast, if the high-pressure discharge lamp is extinguished before passing the predetermined time period (for example, 10 minutes) to stabilize the temperature of the lamp, the ballast performs a control so as to immediately start pulse application. Therefore, steady state operation is followed by an increased dielectric breakdown voltage to suppress unnecessary generation of a high voltage in a time zone in which re-ignition is unachievable by a high voltage for ignition, so that discharge can be reduced in an outer tube.

In another example, a high pressure discharge lamp ballast as known in the art is provided with a first time counter adapted to count the lighting time of a high-pressure discharge lamp. A time converter is adapted to convert the counted lighting time into a pulse waiting time TW in accordance with a fixed conversion ratio established in advance. A second time counter is adapted to count an elapsed time TP from turning off of a power source to re-supplying of the power source. A comparison circuit is adapted to compare the pulse waiting time TW to the elapsed time TP, and depending on the comparison result an output controller adapted to cause an ignition voltage generating circuit to operate immediately if TW is equal to or less than TP and to cause the ignition voltage generating circuit to operate after passing a time period (TW−TP) if TW is larger than TP. The lamp ballast according to this example thereby determines a time period required to reach a state where instant re-ignition of the lamp is allowed from a state where the power source is re-supplied. The determination is made on the basis of a predetermined characteristic, followed by, in accordance with the determination result, performing a control to apply a high-pressure pulse immediately and a control to apply a high-pressure pulse after passing a predetermined time period.

As mentioned above, the conventional high pressure discharge lamp ballast repeatedly attempts an ignition operation established in advance.

However, a high-pressure discharge lamp which is extinguished prior to achieving steady state operation can be brought into various kinds of states which differ from an initial (cold) ignition state, and it is therefore not necessarily ignited even if a high pressure discharge lamp ballast repeats the fixed ignition operation that has been established in advance.

BRIEF SUMMARY OF THE INVENTION

The present invention was achieved by taking the above problems into consideration, having an object to provide a high pressure discharge lamp ballast for easily restarting a high-pressure discharge lamp even if the lamp is extinguished prior to achieving stable lighting, and for bringing the lamp into various states of operation upon re-ignition.

A high pressure discharge lamp ballast according to a first aspect of the present invention includes a power supply circuit for supplying AC power to a high-pressure discharge lamp. An ignition voltage generating circuit is provided for igniting the lamp by repeatedly supplying a high-voltage ignition pulse to the lamp. A pulse control circuit is adapted to alternately perform, in an unlit state of the lamp and with respect to the ignition voltage generating circuit, a control to continuously repeat the high-voltage ignition pulse only for a first time period, and a control to delay repeating the high-voltage ignition pulse only for a second time period. An abnormality detection circuit is adapted to detect an abnormal lighting state of the lamp. The pulse control circuit is configured to change a ratio of the second time period relative to the first time period, if the abnormality detection circuit detects an abnormal lighting state of the lamp, and further if a condition associated with the abnormal lighting state corresponds to a predetermined condition.

According to a second aspect of the present invention, the pulse control circuit makes a ratio of the second time period relative to the first time period larger than that obtained before the abnormality detection, if the condition associated with the abnormal lighting state corresponds to the predetermined condition.

According to a third aspect of the present invention, the pulse control circuit makes the ratio of time larger than that obtained before the abnormality detection by making the first time period shorter than that obtained before the detection, if the condition associated with the abnormal lighting state corresponds to the predetermined condition.

According to a fourth aspect of the present invention, the pulse control circuit makes the ratio of time larger than that obtained before the abnormality detection by making the second time period longer than that obtained before the detection, if the condition associated with the abnormal lighting state corresponds to the predetermined condition.

According to a fifth aspect of the present invention, a second time period obtained after changing the ratio of time is longer than a time period required to reactivate a high-pressure discharge lamp that has been extinguished after having achieving stable lighting of the lamp.

According to a sixth aspect of the present invention, the abnormality detection circuit detects an abnormal lighting state of a high-pressure discharge lamp by detecting half-wave discharge, in other words by detecting asymmetrical electrode discharge such as may be associated with lamp rectification.

According to a seventh aspect of the present invention, the abnormality detection circuit detects an abnormal lighting state of a high-pressure discharge lamp by detecting an extinguished state of the lamp, the lamp having once previously achieved a lit state.

According to an eighth aspect of the present invention, the abnormality detection circuit detects an abnormal lighting state of a high-pressure discharge lamp by detecting an unlit state of the high-pressure discharge lamp.

According to a ninth aspect of the present invention, the pulse control circuit controls the ignition voltage generating circuit so as to delay repeating the high-voltage ignition pulse if the abnormality detection circuit detects an abnormal lighting state of a high-pressure discharge lamp after making the ratio of time larger than that obtained before the abnormality detection.

A lighting fixture according to a tenth aspect of the present invention includes the high pressure discharge lamp ballast according to any one of the first to ninth aspects of the present invention, a fixture main body for mounting the high pressure discharge lamp ballast, and a high-pressure discharge lamp with power supplied from the lamp ballast.

An illumination system according to an eleventh aspect of the present invention includes a plurality of lighting fixtures according to the tenth aspect of the present invention and a control device for controlling each of the lighting fixtures.

According to the first aspect of the present invention, if an ignition voltage applied to the high-pressure discharge lamp fluctuates in igniting the lamp, a ratio of time to delay repeating the high-voltage ignition pulse (second time period) relative to a time period to repeat the high-voltage ignition pulse (first time period) is adjusted to allow easier ignition of the lamp.

According to the second aspect of the present invention, even if the high-pressure discharge lamp has a high temperature with an increased ignition voltage (dielectric breakdown voltage) applied for igniting the lamp, and in the case of having a fluctuating ignition voltage for the lamp, a ratio of time to delay repeating the high-voltage ignition pulse (second time period) relative to a time period to repeat the high-voltage ignition pulse (first time period) is made larger to decrease a temperature of the lamp and realize a lower ignition voltage, whereby ignition of the lamp can be made easier.

According to the third aspect of the present invention, a time period during which the high-pressure discharge lamp generates heat can be shortened by making a time period to repeat the high-voltage ignition pulse shorter, and a temperature of the lamp can be reduced in a short time period, whereby the lamp can be activated easily in a short time period.

According to the fourth aspect of the present invention, a sufficient cooling time period can be established for the high-pressure discharge lamp by extending a time period to delay repeating a high-voltage ignition pulse, whereby ignition of the lamp can be made easier.

According to the fifth aspect of the present invention, even if the high-pressure discharge lamp has a high ignition voltage, the lamp can be sufficiently cooled down to realize a lower ignition voltage, whereby ignition of the lamp can be ensured.

According to the sixth aspect of the present invention, even if half-wave discharge continues upon reigniting the high-pressure discharge lamp after the lamp is lit for a short time period, a cooling period can be established for the lamp, thereby making it possible to ensure ignition.

According to the seventh aspect of the present invention, even if re-ignition is difficult due to a high temperature of an arc tube arranged in the high-pressure discharge lamp, a cooling period can be established for the lamp, thereby making it possible to ensure re-ignition of the lamp.

According to the eighth aspect of the present invention, the abnormality detection circuit detects an unlit state of a high-pressure discharge lamp, whereby safety can be enhanced in a continuous abnormal lighting state such as observed at the end-of-life stage of the lamp or the equivalent.

According to the ninth aspect of the present invention, generation of an abnormal discharge can be prevented by terminating a repeated high-voltage ignition pulse at the end-of-life stage of a high-pressure discharge lamp, whereby safety can be enhanced.

According to the tenth aspect of the present invention, if the ignition voltage applied to a high-pressure discharge lamp fluctuates in igniting the high-pressure discharge lamp, the lamp ballast changes a ratio of time to delay repeating a high-voltage ignition pulse (second time period) relative to a time period to repeat a high-voltage ignition pulse (first time period), whereby ignition of the lamp can be made easier.

According to the eleventh aspect of the present invention, if the ignition voltage applied to a high-pressure discharge lamp fluctuates in igniting the high-pressure discharge lamp, the lamp ballast changes a ratio of time to delay repeating a high-voltage ignition pulse (second time period) relative to a time period to repeat a high-voltage ignition pulse (first time period), whereby ignition of the high-pressure discharge lamp can be made easier.

DETAILED DESCRIPTION OF THE INVENTION

Figure 1:
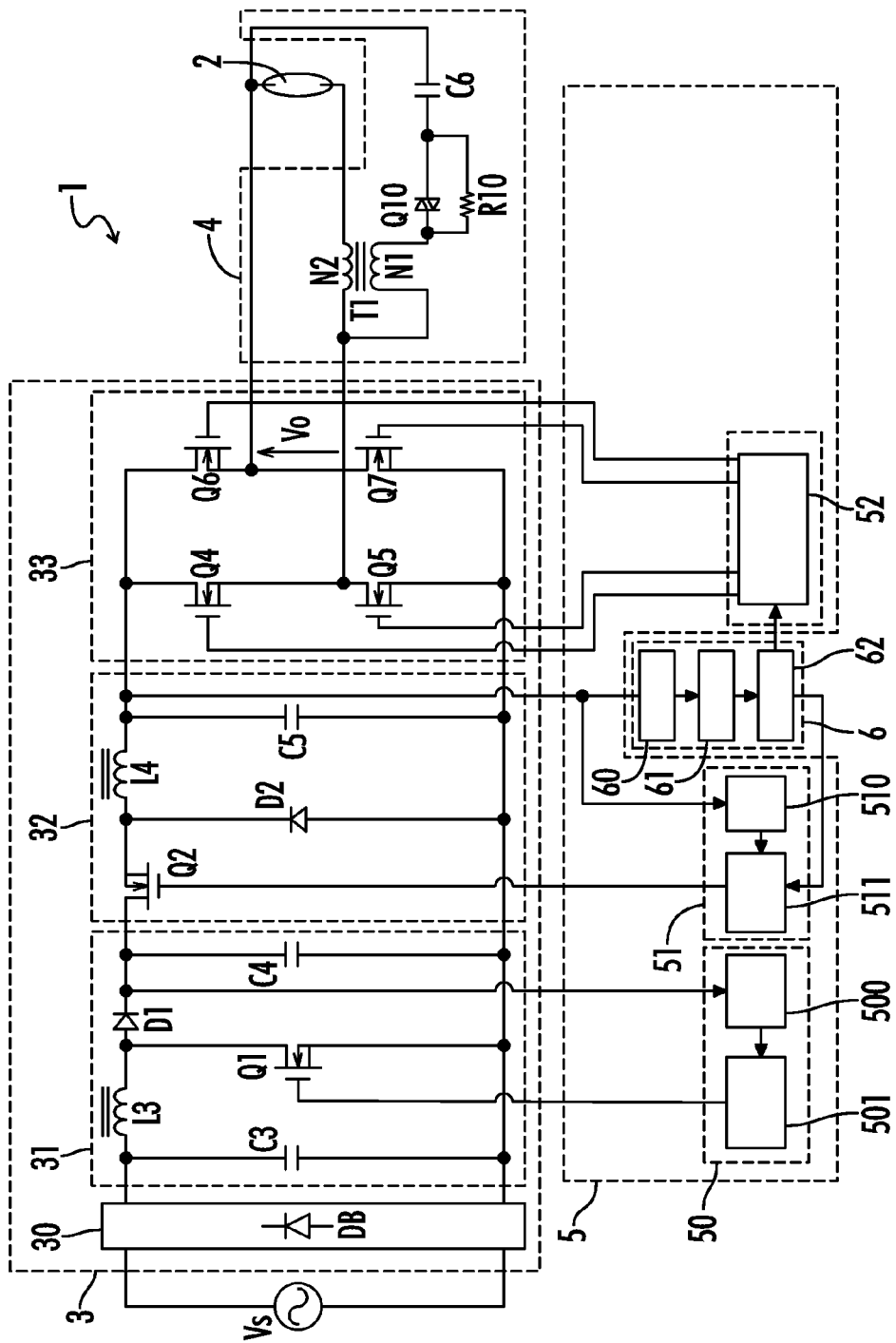
FIG. 1 is a circuit diagram showing a high pressure discharge lamp ballast according to an embodiment of the present invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data or other signal. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

A high-pressure discharge lamp ballast in accordance with the present invention may be described herein with reference to FIGS. 1-13. Where the various figures may describe embodiments sharing various common elements and features with other embodiments, similar elements and features are given the same reference numerals and redundant description thereof may be omitted below.

Referring first to FIG. 1, an embodiment of a circuit for a high pressure discharge lamp ballast may be described. The lamp ballast 1 according to the present embodiment supplies power to a high-pressure discharge lamp 2. The lamp ballast 1 includes a power supply circuit 3 for supplying AC power to the lamp 2, an ignition voltage generating circuit 4 for igniting the lamp 2 by repeatedly supplying a high-voltage ignition pulse to the lamp 2, a control circuit 5 for controlling power supply to the lamp 2, and an abnormality detection circuit 6 for detecting an abnormal lighting state of the lamp 2.

The power supply circuit 3 includes a rectifier circuit 30 made of a diode bridge DB for rectifying an AC voltage output from a commercial power source Vs, a step-up chopper circuit 31 for providing a DC voltage output by boosting a voltage rectified in the diode bridge DB, a step-down chopper circuit 32 for supplying appropriate power to the high-pressure discharge lamp 2 by converting the DC voltage output from the step-up chopper circuit 31 into power, and an inverter circuit 33 for supplying rectangular wave electric power to the high-pressure discharge lamp 2 by using a voltage output from the step-down chopper circuit 32 as a rectangular wave voltage.

The ignition voltage generating circuit 4 is connected between an output side of the inverter circuit 33 and the high-pressure discharge lamp 2. The ignition voltage generating circuit 4 includes a pulse transformer T1 with a secondary winding N2 connected in series to the lamp 2, a switching element Q10 of a voltage response type to be connected in series to a primary winding N1 of the pulse transformer T1 and turned on if a voltage between both ends thereof exceeds a predetermined value, a capacitor C6 connected in series to the primary winding N1 of the pulse transformer T1 and the switching element Q10, and a resistor R10 connected in parallel with the switching element Q10 so as to control a charge voltage for the capacitor C6 when the switching element Q10 is turned off.

The control circuit 5 includes a step-up control circuit 50 for controlling a switching element Q1 in accordance with a voltage output from the step-up chopper circuit 31, a step-down control circuit 51 for controlling a switching element Q2 in accordance with a voltage output from the step-down chopper circuit 32, and a detection result of the abnormality detection circuit 6, and an inverter control circuit 52 for controlling a switching operation performed by switching elements Q4 to Q7 in the inverter circuit 33.

The step-up control circuit 50 includes a step-up chopper output detection circuit 500 for detecting a voltage output from the step-up chopper circuit 31, and a step-up chopper control circuit 501 for controlling the switching element Q1 in accordance with a detection result of the step-up chopper output detection circuit 500.

The step-down control circuit 51 includes a step-down chopper output detection circuit 510 for detecting a voltage output from the step-down chopper circuit 32, and a step-down chopper control circuit 511 for controlling the switching element Q2 in accordance with detection results of the abnormality detection circuit 6 and the step-down chopper output detection circuit 510.

The inverter control circuit 52 controls the switching elements Q4 to Q7 to perform a switching operation so as to alternately repeat a first state of turning on the switching elements Q4 and Q7 and turning off the switching elements Q5 and Q6 and a second state of turning off the switching elements Q4 and Q7 and turning on the switching elements Q5 and Q6.

Owing to the above operation, the control circuit 5 alternately performs, at ignition of the high-pressure discharge lamp 2 and with respect to the ignition voltage generating circuit 4, a first control mode for providing repeated high-voltage ignition pulses only for a first time period and a second control mode to delay repeating a high-voltage ignition pulse only for a second time period. The control circuit 5 corresponds to a pulse control circuit in the present invention.

The abnormality detection circuit 6 includes an abnormality determination circuit 60 for determining whether or not the high-pressure discharge lamp 2 is in an abnormal lighting state, an abnormality counting circuit 61 for measuring an abnormal time period in response to a signal sent from the abnormality determination circuit 60, and a comparison circuit 62 for comparing the abnormal time period to a predetermined time period and transmitting a comparison result to the step-down chopper control circuit 511 and the inverter control circuit 52. The abnormality detection circuit 6 in an embodiment detects an abnormal lighting state of the high-pressure discharge lamp 2 by detecting an unlit state of the high-pressure discharge lamp 2.

Figure 2:
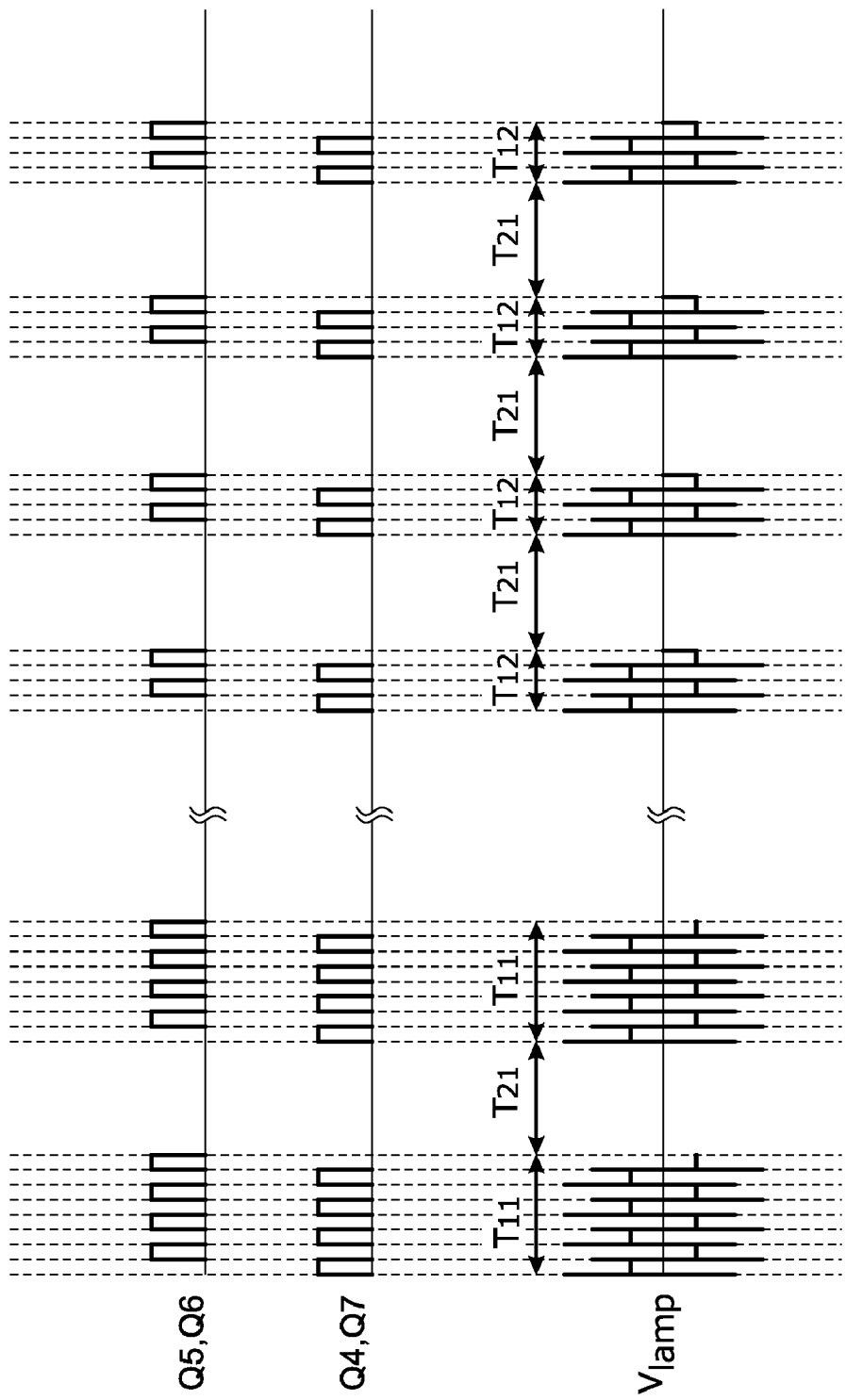
FIG. 2 is a time chart showing an operation of the high pressure discharge lamp ballast of FIG. 1.

Referring now to FIG. 2, and with regards to the high pressure discharge lamp ballast 1 structure as shown in FIG. 1, the switching elements Q4 to Q7 in the inverter circuit 33 may be controlled to perform a switching operation so as to repeat the first state and the second state alternately in a first time period T11, whereby a high-voltage ignition pulse is generated. After continuously repeating a high-voltage ignition pulse for the duration of a first time period T11, each of the switching elements Q4 to Q7 are turned off to delay repeating of the high-voltage ignition pulse. After keeping the switching elements Q4 to Q7 off, and thereby terminating the high-voltage ignition pulse for the duration of a second time period T21, the switching elements Q4 to Q7 are restarted to perform a switching operation, and a high-voltage ignition pulse is continuously repeated for the first time period T11. These operations are repeated to provide an intermittently repeated high-voltage ignition pulse.

Meanwhile, the high-pressure discharge lamp 2 internally enters a state of high temperature/pressure immediately after being extinguished, wherein a dielectric breakdown voltage for the lamp becomes extremely high. This state is substantially the same as an unloaded state with no connections between the lamp 2 and the lamp ballast 1. The lamp ballast 1 is unable to easily distinguish and detect a state immediately after extinguishing of the high-pressure discharge lamp 2 and an unloaded state, whereby a high-voltage ignition pulse is generated by the ballast 1 even in an unloaded state. Moreover, even if an ignition failure occurs due to, for example, an end-of-life condition of the lamp 2, the lamp ballast 1 nevertheless generates a high-voltage ignition pulse.

In an unlit state of the high-pressure discharge lamp 2, the step-down chopper circuit 32 outputs a DC voltage which is higher than a voltage used during steady state operation of the lamp 2 in order to facilitate a proper ignition of the lamp 2. The inverter circuit 33 converts the DC voltage into a rectangular wave voltage which is output to the lamp 2 via the ignition voltage generating circuit 4.

In the ignition voltage generating circuit 4, the capacitor C6 is charged via the primary winding N1 of the pulse transformer T1 and the resistor R10. Applied to the switching element Q10 are a voltage output from the inverter circuit 33 and a voltage (indicated by V1) between both ends of the capacitor C6. Since a voltage output from the inverter circuit 33 is substantially the same as a voltage (indicated by V2) output from the step-down chopper circuit 32, a voltage applied to the switching element Q10 equals |V2|−|V1| when the rectangular wave voltage is in a stable state, which means the voltage does not reach the predetermined voltage necessary to turn on the switching element Q10. Accordingly, the switching element Q10 is not turned on and remains turned off.

On the other hand, the voltage across capacitor C6 is not rapidly changed during polarity inversion of a rectangular wave voltage because it is charged via the resistor R10. Therefore, a voltage applied to the switching element Q10 equals |V2|+|V1|, which means the voltage in fact reaches a voltage necessary to turn on the switching element Q10. Accordingly, the switching element Q10 is turned on.

When the switching element Q10 is turned on, an output capacitor C5 connected to an output end of the step-down chopper circuit 32 is used along with the capacitor C6 as a power source to cause a steep pulse current to flow into the primary winding N1 of the pulse transformer T1, wherein a voltage obtained by multiplying a voltage generated in the primary winding N1 by times of winding (turns ratio) is generated in the secondary winding and applied to the high-pressure discharge lamp 2 as voltage Vlamp. When the lamp 2 is ignited, a voltage output from the step-down chopper circuit 32 is detected by the step-down chopper output detection circuit 510, and the detection result is received to control the step-down chopper circuit 32 so as to provide a predetermined current corresponding to the output voltage, followed by supplying appropriate rectangular wave electric power to the lamp 2 via the inverter circuit 33, so that stable lighting of the lamp 2 is achieved.

If the high-pressure discharge lamp 2 is extinguished for some reason, the abnormality determination circuit 60 detects an abnormal lighting state and determines the lamp 2 is extinguished, after which the ignition voltage generating circuit 4 generates a high-voltage ignition pulse which is then applied to the lamp 2 in order to immediately turn on the lamp 2 again.

Thereafter, if the abnormality detection circuit 6 detects an abnormal lighting state of the high-pressure discharge lamp 2, and a time period during which the abnormal lighting state is observed reaches a set value established in advance, the control circuit 5 makes a ratio of the second time period relative to the first time period larger than that obtained before the detection. In one embodiment, the control circuit 5 makes the ratio of time larger than that obtained before the detection by making the first time period shorter than before.

Figure 3:
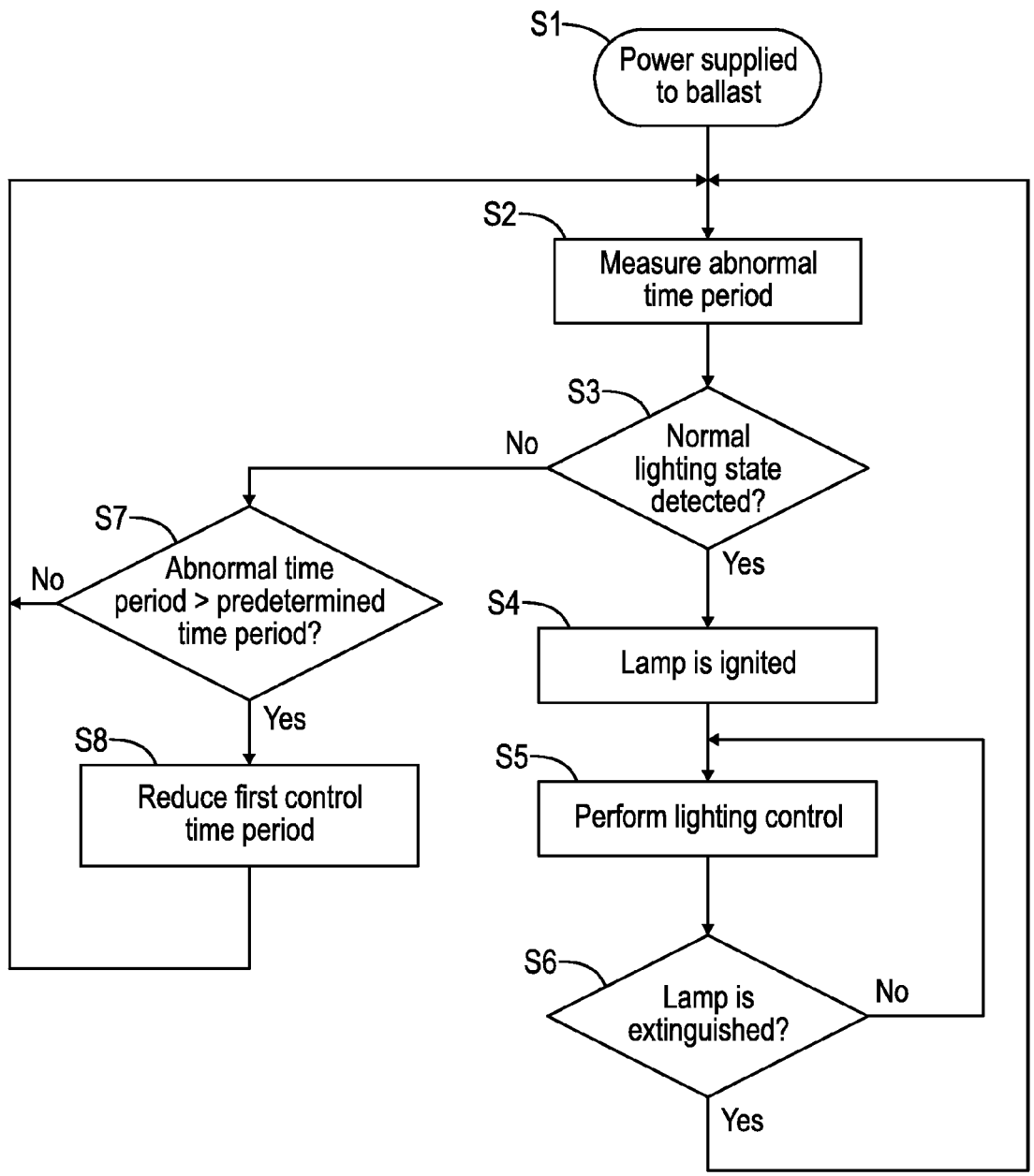
FIG. 3 is a flowchart showing a method of operation of the high pressure discharge lamp ballast of FIG. 1.

Referring now to FIG. 3, explained next will be an operation of various embodiments of the high pressure discharge lamp ballast 1 such as for example that shown in FIG. 1. First, when the commercial power source Vs is supplied to the lamp ballast 1, the step-up chopper circuit 31 and the step-down chopper circuit 32 are turned on sequentially (step S1 in FIG. 3). The abnormality counting circuit 61 measures an abnormal time period as counted from when power was initially supplied from the commercial power source Vs (step S2).

A voltage output from the step-down chopper circuit 32 (voltage across output capacitor C5) is converted into a rectangular wave voltage by the switching elements Q4 to Q7 so as to perform a polarity inversion operation in a range from several tens of Hz to several hundreds of Hz. In polarity inversion as described above, the switching element 10 breaks over to cause a steep current to flow into the primary winding N1 of the pulse transformer T1. As a result, a high-voltage ignition pulse is generated in the secondary winding N2, followed by a dielectric breakdown in the high-pressure discharge lamp 2. Following next is determination of a lighting state of the lamp 2. More specifically, the abnormality detection circuit 60 detects a voltage output from the step-down chopper circuit 32, followed by determining the lamp 2 is in a normal lighting state (normal discharge) if the output voltage is less than a threshold value or determining an abnormal lighting state (abnormal discharge) of the lamp 2 if the output voltage is equal to or more than a threshold value (step S3).

If the high-pressure discharge lamp 2 is determined to be in a normal lighting state, the lamp 2 is ignited (step S4) and a lighting control is performed (step S5). Thereafter, if the lamp 2 becomes extinguished and is determined to be in an unlit state (step S6), re-ignition begins (return to step S2).

In contrast, if the high-pressure discharge lamp 2 is determined to be in an abnormal lighting state (abnormal discharge) at step S3, the comparison circuit 62 compares an abnormality time period to a predetermined time period established in advance (step S7), and if the abnormality time period does not exceed the predetermined time period, the ignition voltage generating circuit 4 repeats an ignition operation again to apply a high-voltage ignition pulse to the lamp 2 (return to step S2).

However, if the abnormal time period does exceed the predetermined time period, the high-pressure discharge lamp 2 is determined to be in a problem state or at the least non-optimal ignition state, followed by adjusting the first time period T11 serving as a time period to operate the ignition voltage generating circuit 4 to T12 (where T12<T11) in order to cool down the lamp 2, whereby a time period to repeat a high-voltage ignition pulse is shortened (step S8). After adjusting the first time period T11 to T12, the ignition voltage generating circuit 4 is operated again to continuously repeat a high-voltage ignition pulse for the time period T12 (return to step S2).

According to an embodiment of the present invention and as stated above, if an ignition voltage (dielectric breakdown voltage) applied to the high-pressure discharge lamp 2 is high due to a high temperature of the lamp 2 in igniting the lamp 2, or even if the lamp 2 has a high ignition voltage, a ratio of a time period to delay repeating a high-voltage ignition pulse (second time period) relative to a time period to repeat a high-voltage ignition pulse (first time period) is made larger to lower a temperature of the high-pressure discharge lamp 2 and realize a lower ignition voltage. The lamp 2 can thereby be easily activated in comparison with the case observed prior to making the ratio of time larger.

Because a time period during which the high-pressure discharge lamp 2 generates heat can be shortened by making a time period to repeat a high-voltage ignition pulse (first time period) shorter, the temperature of the lamp 2 can be reduced in a short time period, whereby the lamp 2 can be easily ignited in a short time period in comparison with the case observed prior to making the first time period shorter.

In various embodiments, the ballast 1 also makes it possible to enhance safety by using the abnormality detection circuit 6 to detect an unlit state of the high-pressure discharge lamp 2 in a continuous abnormal lighting state such as associated with an end-of-life condition or equivalent states of the lamp 2.

In an embodiment as described, the ballast 1 delays repeating of a high-voltage ignition pulse by terminating operation of the inverter circuit 33 instead of directly terminating operation of the ignition voltage generating circuit 4, but methods for delaying a repeated high-voltage ignition pulse are not limited to the above description, and the ignition voltage generating circuit 4, the step-up chopper circuit 31 and the step-down chopper circuit 32 or other components may also be terminated in like fashions.

Moreover, in an alternative embodiment, the abnormality counting circuit 61 may also count the number of times that an abnormality is detected instead of measuring an abnormal time period. In this case, the comparison circuit 62 compares the number of times of abnormalities to a predetermined number of times established in advance, and if the number of times of abnormalities reaches the predetermined number of times, the first time period is made shorter to shorten a time period to repeat a high-voltage ignition pulse. This case similarly applies to following embodiments.

Figure 4:
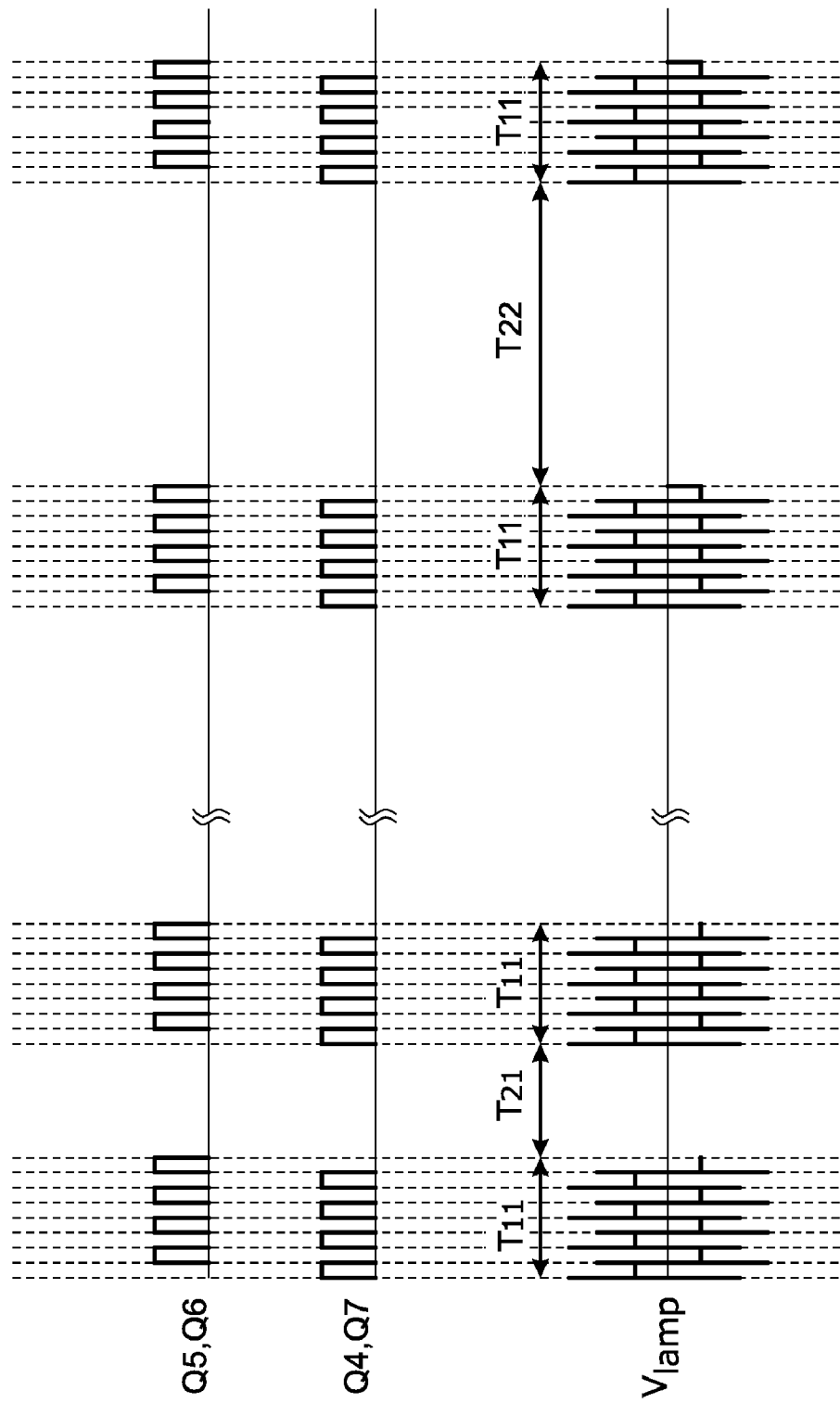
FIG. 4 is a time chart showing an operation of a high pressure discharge lamp ballast according to another embodiment of the present invention.

Referring now to FIG. 4, in an alternative embodiment a high pressure discharge lamp ballast 1 differs in operation from those previously described in that a second time period serving as a period to delay the ignition voltage generating circuit 4 is extended, instead of shortening a first time period serving as a period to operate the ignition voltage generating circuit 4, if an abnormality time period exceeds the predetermined time period.

If a time period during which an abnormal lighting state is observed exceeds a predetermined time period, the control circuit 5 according to the present embodiment thereby makes a ratio of time (T22/T11) larger than that obtained before the detection (T21/T11) by adjusting the second time period from T21 to T22 (where T22>T21).

Figure 5:
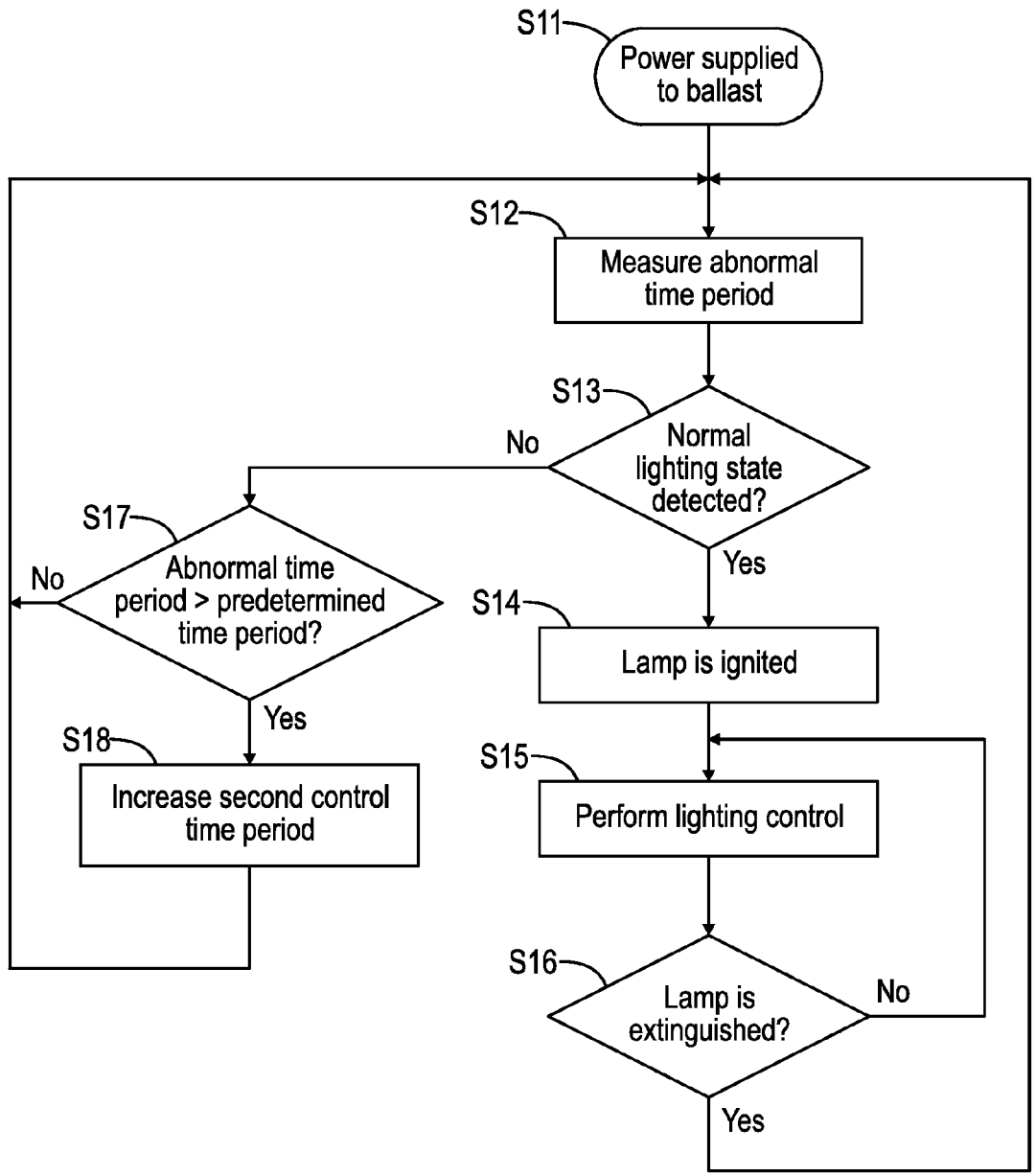
FIG. 5 is a flowchart showing an operation of the high pressure discharge lamp ballast according to the embodiment of FIG. 4.

Referring now to FIG. 5, operation of the high pressure discharge lamp ballast 1 consistent with the embodiment of FIG. 4 may be described. First, when the commercial power source Vs is supplied to the high pressure discharge lamp ballast 1, the step-up chopper circuit 31 and the step-down chopper circuit 32 are turned on sequentially (step S11 in FIG. 5), and the abnormality counting circuit 61 measures an abnormal time period counted from the initial supplying of power from the DC power source Vs (step S12).

The abnormality determination circuit 60 detects a voltage output from the step-down chopper circuit 32, followed by determining the high-pressure discharge lamp 2 is in a normal lighting state if the output voltage is less than a threshold value, or determining an abnormal lighting state of the lamp 2 if the output voltage is equal to or more than a threshold value (step S13).

If the high-pressure discharge lamp 2 is determined to be in a normal lighting state, the lamp 2 is ignited (step S14) and a lighting control is performed (step S15). Thereafter, if the lamp 2 is extinguished and determined to be in an unlit state (step S16), re-ignition begins (step S12).

On the other hand, if the high-pressure discharge lamp 2 is determined to be in an abnormal lighting state, the comparison circuit 62 compares a measured abnormal time period to a predetermined time period (step S17), and if the abnormal time period does not exceed the predetermined time period, the ignition voltage generating circuit 4 repeats an ignition operation again to apply a high-voltage ignition pulse to the lamp 2 (return to step S12).

If the abnormal time period does exceed the predetermined time period, the high-pressure discharge lamp 2 is determined to be in a difficult ignition state, and the second time period serving as a period to delay the ignition voltage generating circuit 4 is switched from T21 to T22 (where T22>T21) in order to cool down the lamp 2, so that a time period to delay a high-voltage ignition pulse is extended (step S18). After adjusting the second time period from T21 to T22, the ignition voltage generating circuit 4 is operated again to extend a time period to delay a high-voltage ignition pulse for the time period T22 (return to step S12).

In such a manner, a sufficient cooling time period can be established for the high-pressure discharge lamp 2 by extending a time period to delay repeating a high-voltage ignition pulse, thereby making it easier to ignite the lamp 2 in a short time period. That is, a period to cool down the lamp 2 is proactively increased so as to ensure ignition of the lamp 2 having an unstable internal state in the arc tube 21.

Once the high-pressure discharge lamp 2 is extinguished after having been lit with a high temperature inside the arc tube 21, a high voltage is required for re-ignition. A high-voltage pulse generated by the high-pressure discharge lamp ballast 1 according to an embodiment is approximately 5 kV, and a voltage in this range requires approximately 5 minutes to ignite the lamp 2 at the stated high temperature.

Figure 6:
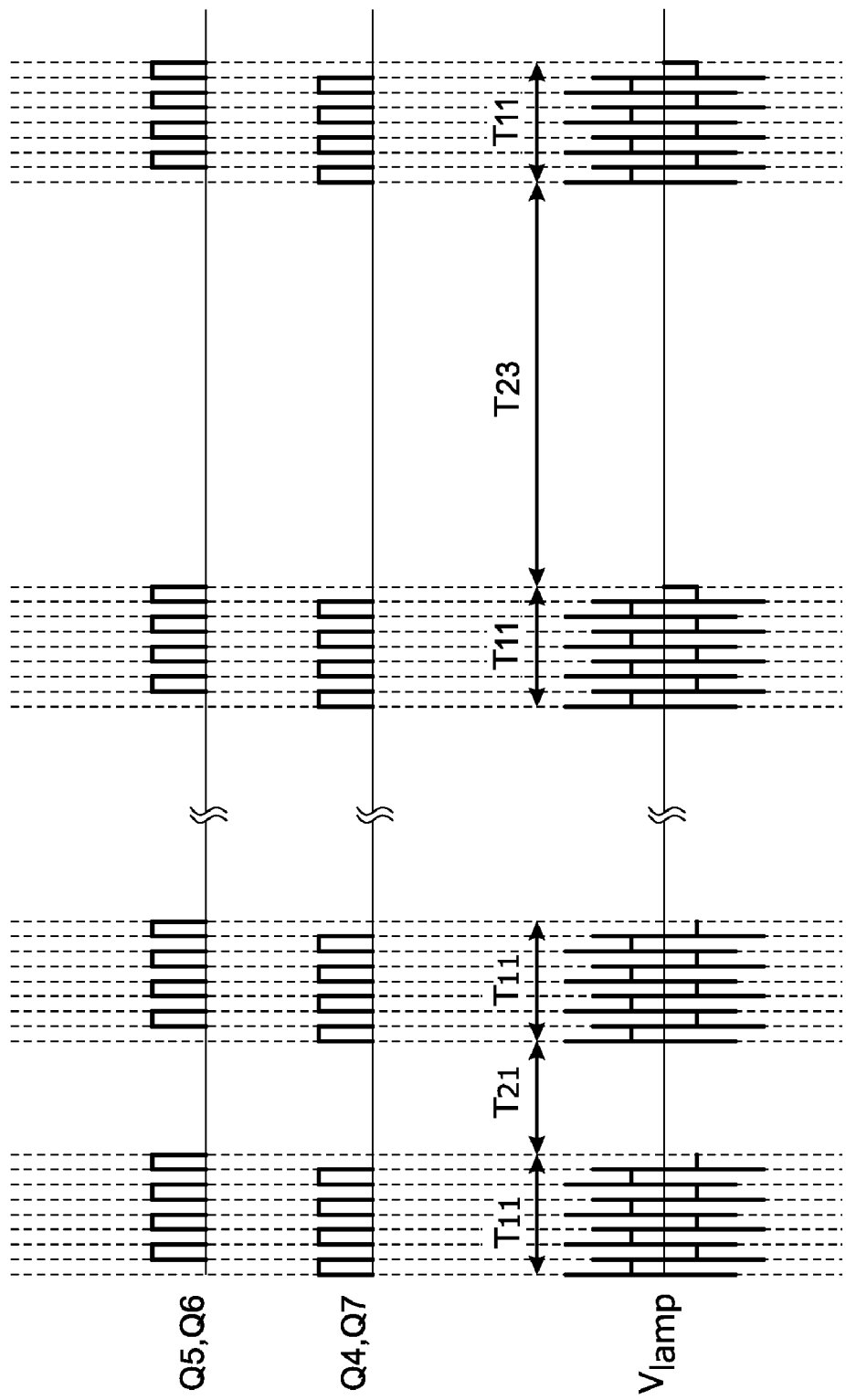
FIG. 6 is a time chart showing an operation of a high pressure discharge lamp ballast according to another embodiment of the present invention.

Referring now to FIG. 6, in another embodiment of the present invention where an abnormal time period exceeds a predetermined time period, the high pressure discharge lamp ballast 1 extends the second time period serving as a period to delay the ignition voltage generating circuit 4. This method differs from various other embodiments in that the second time period to be extended is set longer than a time period to ignite the high-pressure discharge lamp 2.

In other words, a second time period T23 obtained after adjusting a ratio of the second time period relative to the first time period is longer than a time period required to re-ignite the high-pressure discharge lamp 2 which was extinguished after having already achieved stable lighting.

In this manner the high-pressure discharge lamp 2 even with a high ignition voltage can be sufficiently cooled down, and an ignition voltage applied to the lamp 2 can be made lower to ensure ignition of the lamp 2. The present embodiment also makes it possible to ensure ignition of the high-pressure discharge lamp 2 having an unstable internal state in the arc tube 21 by proactively increasing a period to cool down the lamp 2.

As one example of abnormal discharge, there is so-called half-wave discharge (rectification) in which the equivalent impedance of the high-pressure discharge lamp 2 is unbalanced to cause an asymmetrical current flowing into the lamp 2 or an asymmetrical voltage generated across the lamp 2 with respect to positive/negative polarities of a rectangular wave voltage.

Figure 7:
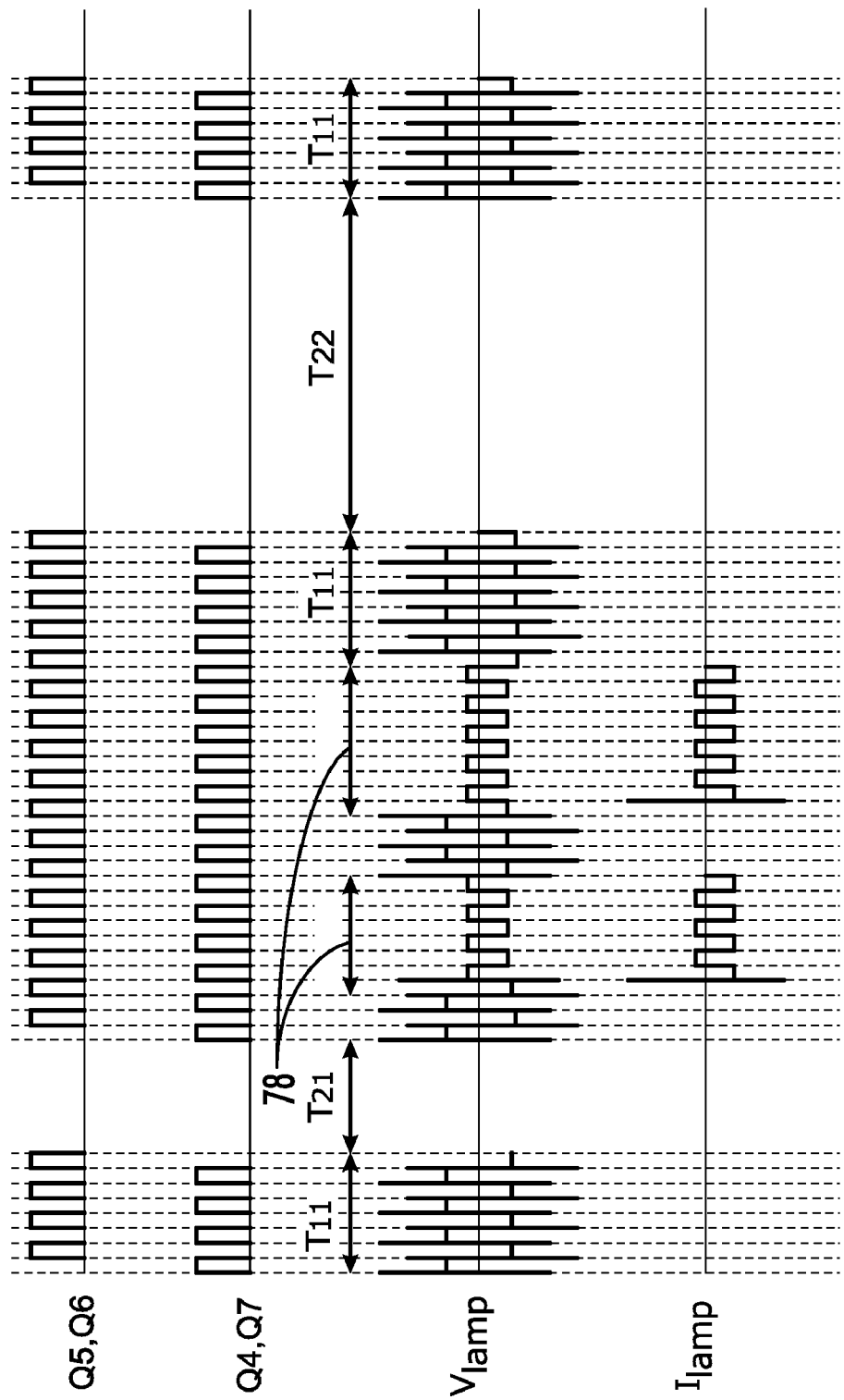
FIG. 7 is a time chart showing an operation of a high pressure discharge lamp ballast according to yet another embodiment of the present invention.
Figure 9:
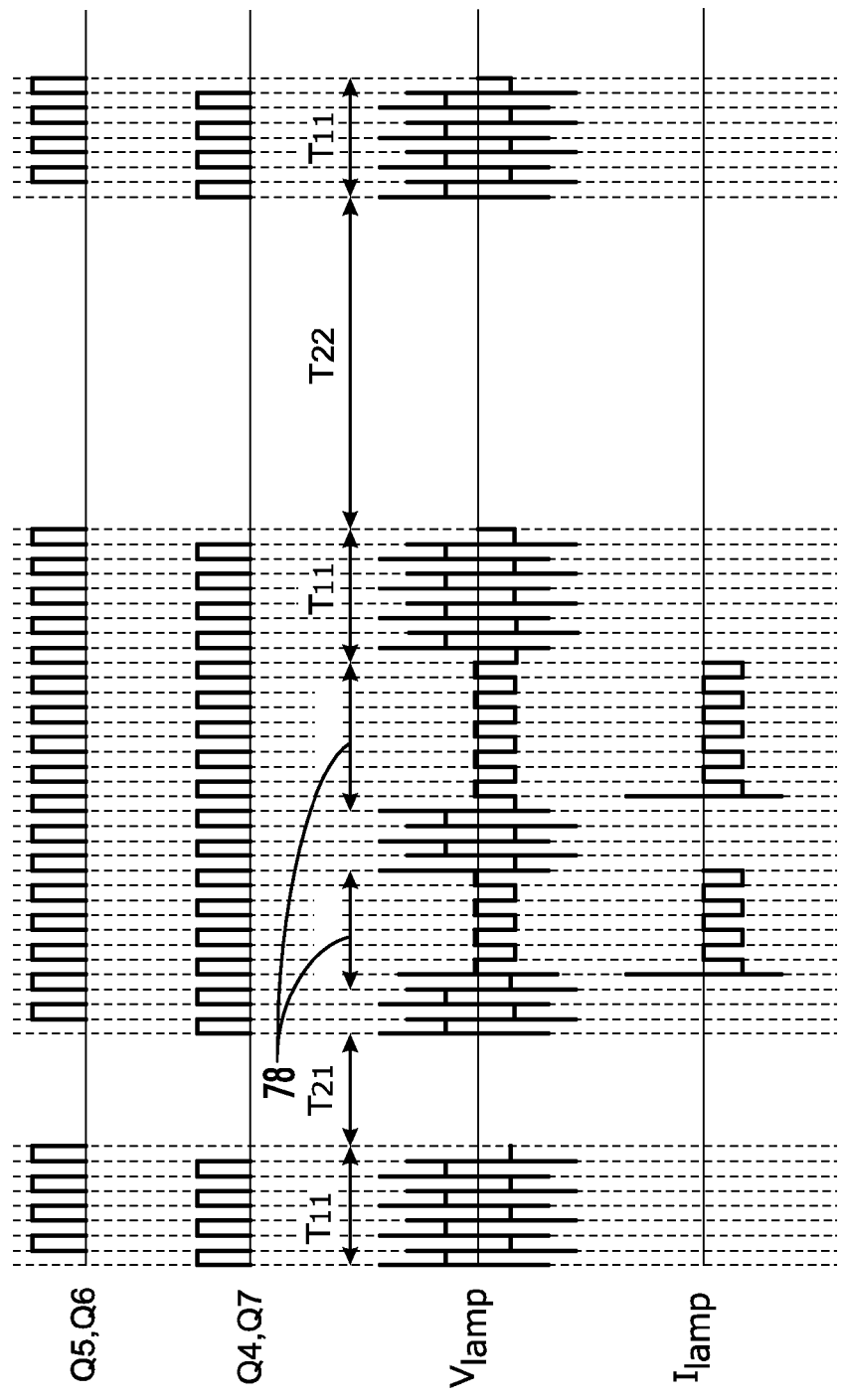
FIG. 9 is a time chart showing an alternative operation of the high pressure discharge lamp ballast according to the embodiment of FIG. 7.

Half-wave discharge, which often occurs intermittently as shown in FIGS. 7 and 9, is a phenomenon frequently observed during the ignition process for a high-pressure discharge lamp 2. An extreme example of half-wave discharge is as shown in FIG. 9, wherein the lamp 2 is lit by one polarity of a rectangular wave voltage whose other polarity actually extinguishes the lamp 2 after polarity inversion. In general, half-wave discharge is easily sustained during attempts to re-ignite a lamp 2 which has been extinguished after having been lit for only a short time period.

Referring now to FIG. 7, the high pressure discharge lamp ballast 1 in an embodiment as compared to previously described embodiments differs in terms of half-wave discharge being proposed as an abnormal state of the lamp 2 in place of an unloaded state. The abnormality detection circuit 6 detects an abnormal lighting state of the high-pressure discharge lamp 2 by detecting half-wave discharge (labeled in FIG. 7 as occurring in time period 78).

Figure 8:
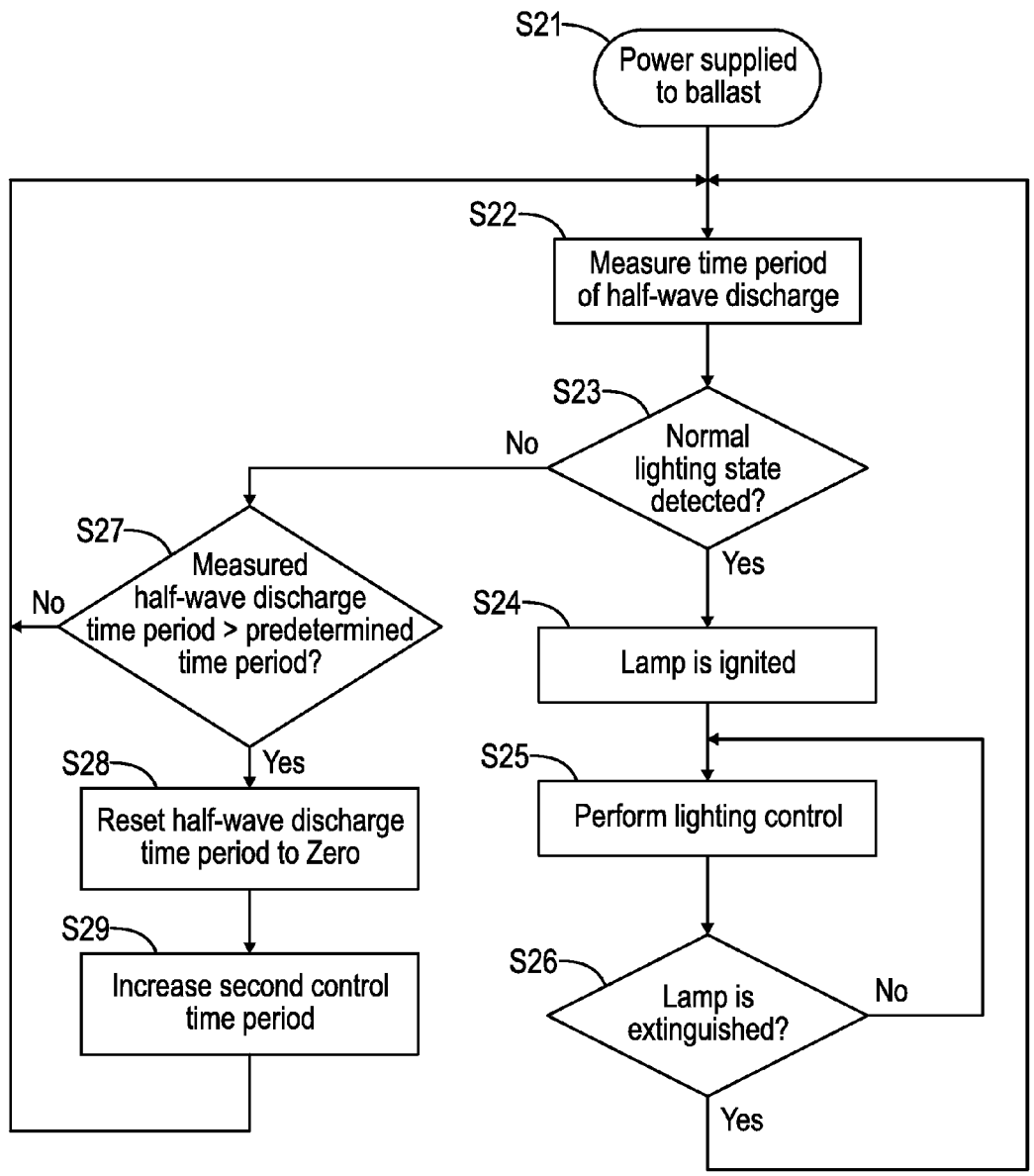
FIG. 8 is a flowchart showing an operation of the high pressure discharge lamp ballast according to the embodiment of FIG. 7.

Operation of the high pressure discharge lamp ballast 1 according to an embodiment as shown in FIG. 7 may be further described with reference to FIG. 8. First, when the commercial power source Vs is supplied to the high pressure discharge lamp ballast 1, the step-up chopper circuit 31 and the step-down chopper circuit 32 are turned on sequentially (step S21), after which an ignition voltage is generated and the abnormality counting circuit 61 measures a cumulative time period for half-wave discharge (step S22).

After having an ignition voltage generated, the abnormality determination circuit 60 detects a voltage output from the step-down chopper circuit 32 for each polarity, followed by determining normal discharge only when continuous bipolar voltages are both in a predetermined voltage range, and determining abnormal discharge in other cases (step S23).

If normal discharge is determined, the high-pressure discharge lamp 2 is ignited (step S24) and a lighting control is performed (step S25). Thereafter, if the lamp 2 is extinguished and determined to be in an unlit state (step S26), re-ignition starts (step S22).

In contrast, if abnormal discharge is determined, the abnormality counting circuit 61 measures a time period 78 for half-wave discharge and the comparison circuit 62 compares a cumulative time period for the half-wave discharge to a predetermined time period (step S27). If the cumulative time period does not reach the predetermined time period, the ignition voltage generating circuit 4 repeats an ignition operation again to apply a high-voltage ignition pulse to the high-pressure discharge lamp 2 (step S22).

Where abnormal discharge may be accompanied by an unstable state, application of a high-voltage ignition pulse to the high-pressure discharge lamp 2 may be stopped once, followed by applying a high-voltage ignition pulse after sufficiently cooling down the lamp 2, thereby making it easier to ignite the lamp 2.

If the cumulative time period for the abnormality (half-wave discharge) is determined to have exceeded a predetermined time period, the cumulative time period for half-wave discharge may be reset (step S28) to delay operation of the ignition voltage generating circuit 4 once in order to cool down the lamp 2. A delay time period here (second time period) is made longer than that in previously described embodiments (step S29). Therefore, the lamp 2 is cooled down sufficiently and brought into a state to allow a discharge easily, followed by operating the ignition voltage generating circuit 4 again to ignite the lamp 2 (step S22).

As stated above, even if half-wave discharge continues upon reigniting the high-pressure discharge lamp 2 which was lit for a short time period, a cooling period can be provided for the lamp 2, thereby making it possible to ensure an ignition.

Figure 10:
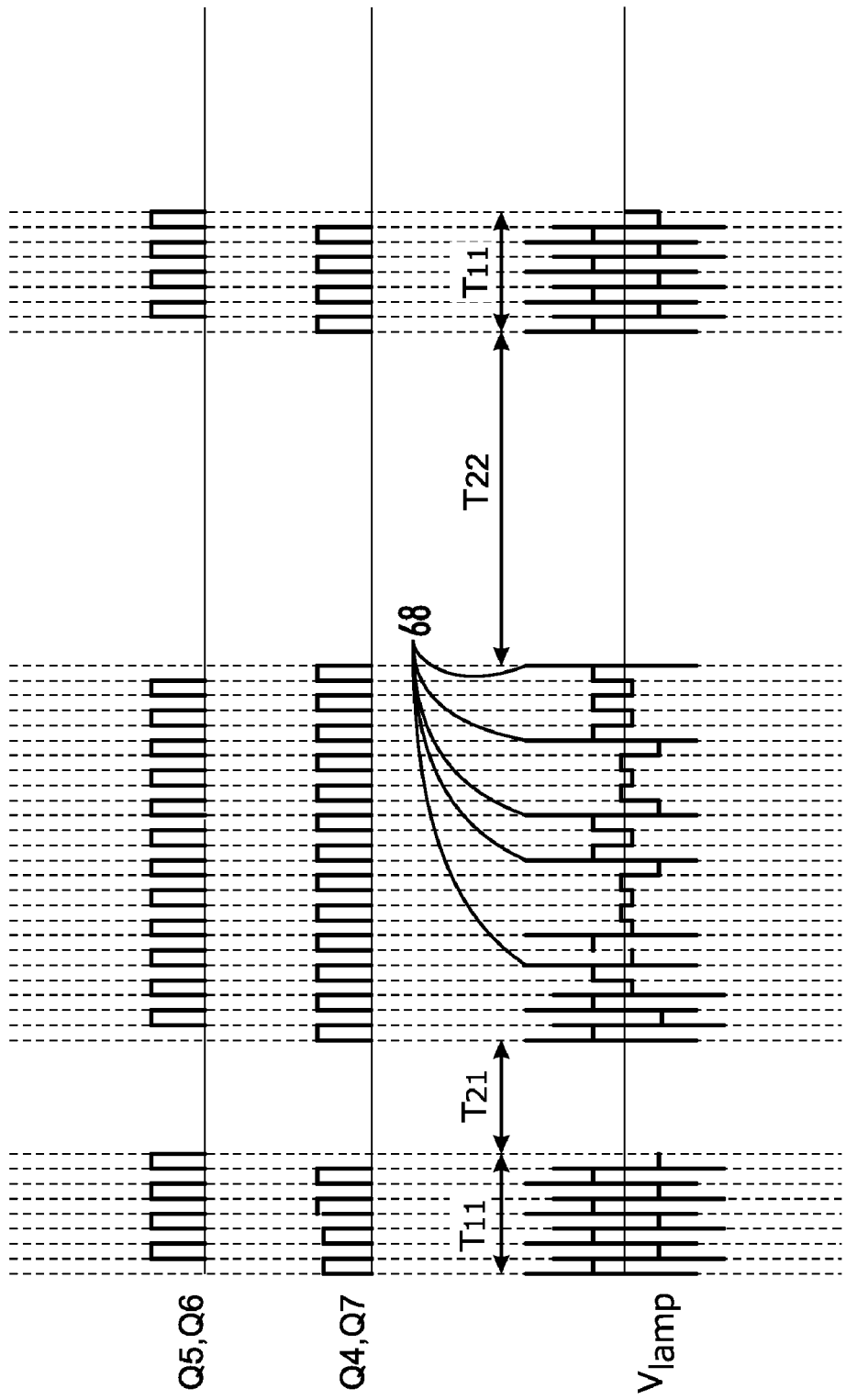
FIG. 10 is a time chart showing an operation of a high pressure discharge lamp ballast according to still another embodiment of the present invention.

Referring now to FIG. 10, in one embodiment a state of repeated lighting interruption is proposed as an abnormal lighting state of the high-pressure discharge lamp 2. If the lamp 2 is turned on for a short time period, a lighting interruption state 68 may subsequently be repeated such that a normal lighting state, in which the lamp 2 is lit by one polarity of the inverter circuit 33 and maintained by a subsequent opposite polarity thereof, is repeatedly brought into an abnormal lighting state by a further subsequent polarity thereof. Such a phenomenon is occasionally observed when the arc tube 21 has an unstable internal state due for example to lighting in a short time period or other causes as known in the art.

The abnormality detection circuit 6 according to the present embodiment detects an abnormal lighting state of the high-pressure discharge lamp 2 by detecting a repeated lighting interruption state 68 in which the high-pressure discharge lamp 2 is extinguished after having been turned on once.

Figure 11:
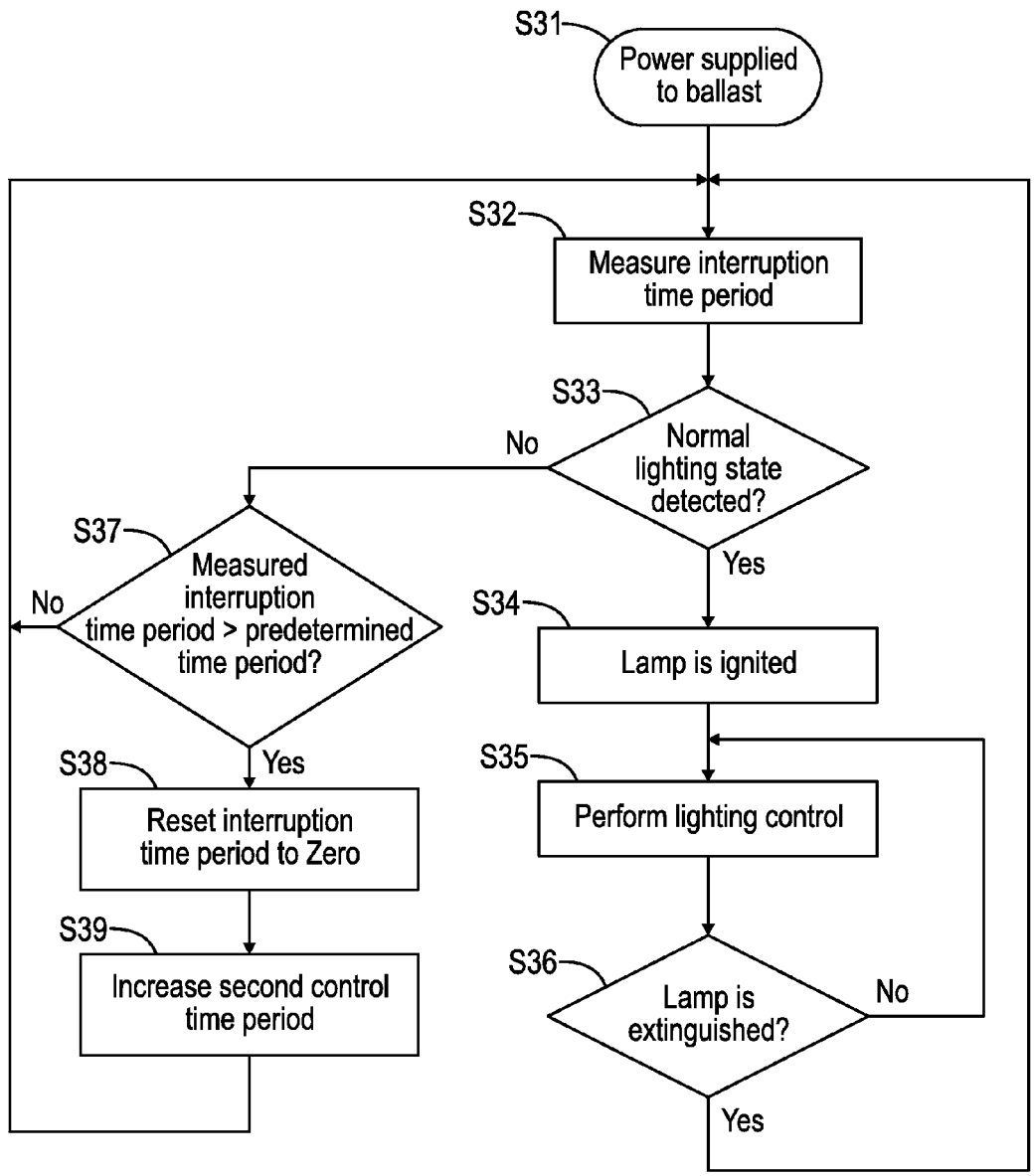
FIG. 11 is a flowchart showing an operation of the high pressure discharge lamp ballast according to the embodiment of FIG. 10.

Referring now to FIG. 11, an operation of the high pressure discharge lamp ballast 1 according to the embodiment may be described further. First, when the commercial power source Vs is supplied to the high pressure discharge lamp ballast 1, the step-up chopper circuit 31 and the step-down chopper circuit 32 are lit sequentially (step S31), and the abnormality counting circuit 61 measures an abnormal time period counted from an initial supply of power to the ballast from the commercial power source Vs (step S32).

The abnormality determination circuit 60 detects a voltage output from the step-down chopper circuit 32, and determines whether or not the lighting operation of the lamp has been interrupted (step S33).

If the lighting has not been interrupted, the high-pressure discharge lamp 2 is ignited (step S34) and a lighting control is performed (step S35). Thereafter, if the lamp 2 becomes extinguished and is determined to be in an unlit or otherwise abnormal lighting state (step S36), re-ignition begins (return to step S32).

On the other hand, if it is determined that lighting has been interrupted, the comparison circuit 62 compares a cumulative time period for the interruption to a predetermined time period (step S37), and if the cumulative time period does not exceed the predetermined time period, the ignition voltage generating circuit 4 repeats an ignition operation again to apply a high-voltage ignition pulse to the high-pressure discharge lamp 2 (return to step S32).

In contrast, if the cumulative time period for the interruption state reaches the predetermined time period, the cumulative time period for the interruption is reset (step S38) to delay the ignition voltage generating circuit 4 operation once in order to cool down the high-pressure discharge lamp 2. The delay time period here (second time period) is made longer than before (step S39). Therefore, the high-pressure discharge lamp 2 is cooled down sufficiently and brought into a state to allow discharge easily, followed by operating the ignition voltage generating circuit 4 again to reactivate the lamp 2 (return to step S32).

As stated above, according to the present embodiment, a lighting interruption is detected and a cooling period is set so as to provide a cooling period for the high-pressure discharge lamp 2 even if the lamp 2 is in a difficult ignition state due to a high temperature of the arc tube 21, so that re-ignition of the lamp 2 can be ensured or at least facilitated.

Figure 12:
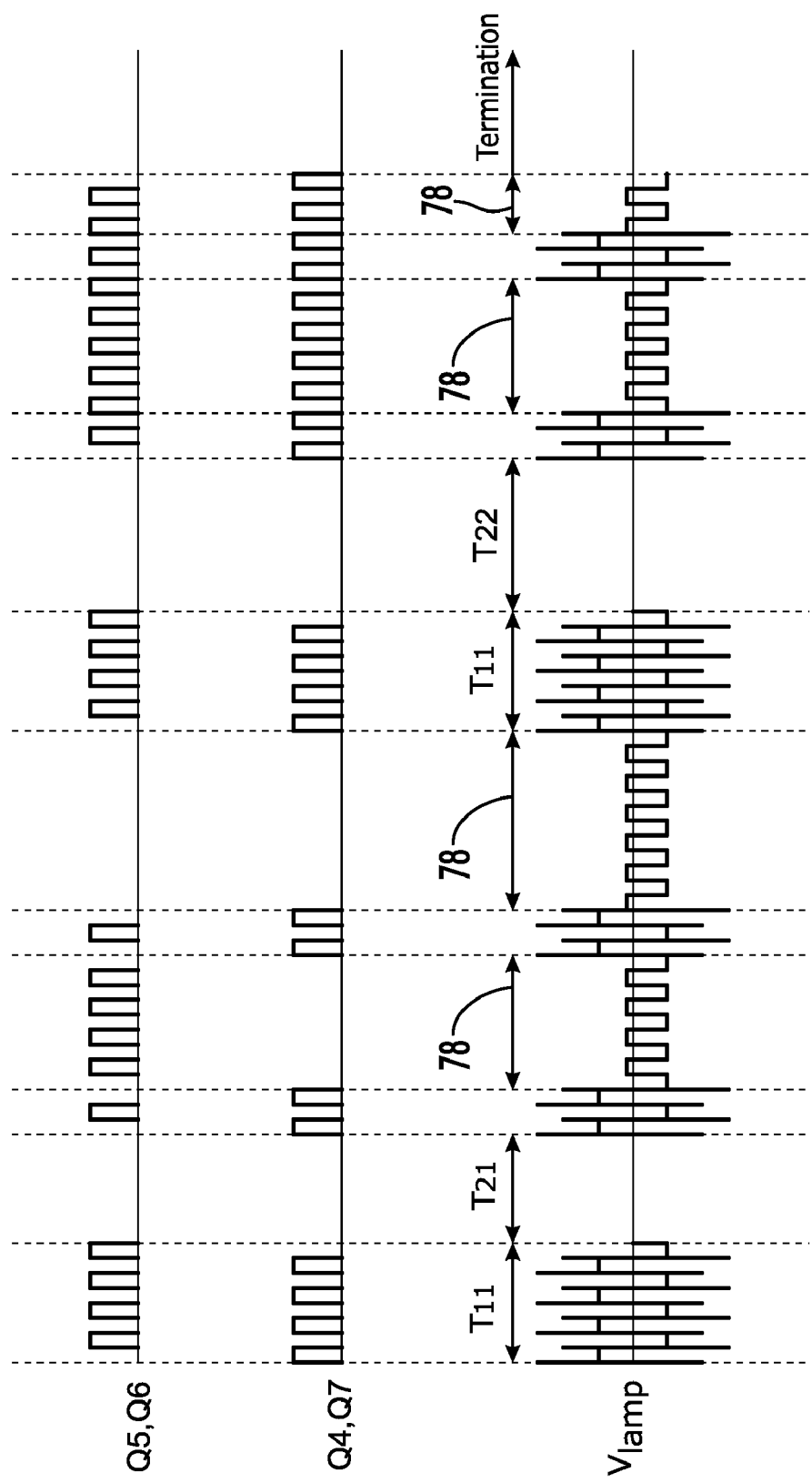
FIG. 12 is a time chart showing an operation of a high pressure discharge lamp ballast according to still another embodiment of the present invention.
Figure 13:
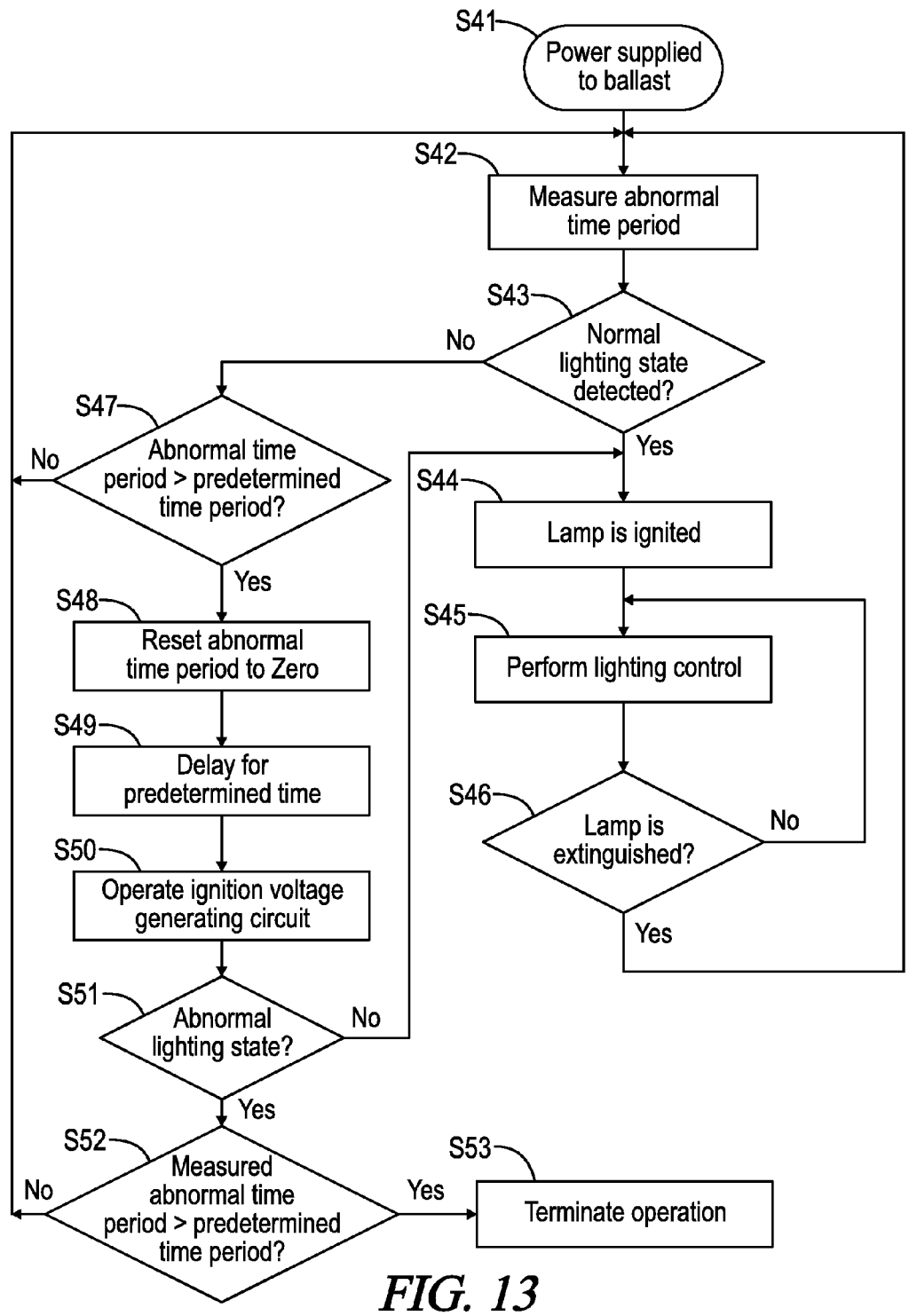
FIG. 13 is a flowchart showing an operation of the high pressure discharge lamp ballast according to the embodiment of FIG. 12.

Referring now to FIGS. 12-13, in an embodiment the high pressure discharge lamp ballast 1 differs from previous embodiments in that, if an abnormal lighting state continues even after passage of a predetermined time period in a re-ignited state of the high-pressure discharge lamp 2 realized by extending the second time period and operating the ignition voltage generating circuit 4 again, the high-pressure discharge lamp 2 is determined to be in a certain abnormal state such as for example an end of life condition or similar, followed by completely terminating operation of the inverter circuit 33.

If the abnormality detection circuit 6 detects an abnormal lighting state of the high-pressure discharge lamp 2 after making the ratio of time larger than that obtained before detection, the control circuit 5 controls the ignition voltage generating circuit 4 so as to delay repeating a high-voltage ignition pulse.

Referring in particular to the operation shown in FIG. 13, when the commercial power source Vs first supplies power to the high pressure discharge lamp ballast 1, the step-up chopper circuit 31 and the step-down chopper circuit 32 are lit sequentially (step S41 in FIG. 13), and the ignition voltage generating circuit 4 is operated (step S42).

The abnormality determination circuit 60 detects a voltage output from the step-down chopper circuit 32, followed by determining the high-pressure discharge lamp 2 is in a normal lighting state if the output voltage is less than a threshold value, or determining an abnormal lighting state of the lamp 2 if the output voltage is equal to or more than a threshold value (step S43).

If the high-pressure discharge lamp 2 is determined to be in a normal lighting state, the lamp 2 is ignited (step S44) and a lighting control is performed (step S45). Thereafter, if the lamp 2 becomes extinguished and is subsequently determined to be in an unlit or otherwise abnormal lighting state (step S46), re-ignition begins (return to step S42).

On the other hand, if the high-pressure discharge lamp 2 is determined to be in an abnormal lighting state, the comparison circuit 62 compares an abnormal time period (labeled as 78 in FIG. 12) to a predetermined time period (step S47), and if the abnormal time period 78 does not exceed the predetermined time period, the ignition voltage generating circuit 4 repeats an ignition operation again to apply a high-voltage ignition pulse to the lamp 2 (return to step S42).

In contrast, if the abnormal time period exceeds the predetermined time period, the high-pressure discharge lamp 2 is determined to be in a difficult ignition state, followed by resetting the abnormal time period (step S48) to switch the second time period serving as a time period to stop the ignition voltage generating circuit 4 from T21 to T22 (where T22>T21) in order to cool down the lamp 2, and extending a time period to delay a high-voltage ignition pulse (step S49). After switching the second time period from T21 to T22, the ignition voltage generating circuit 4 is operated again to extend a time period to stop a high-voltage ignition pulse only for the time period T22 (step S50).

Thereafter, the abnormality determination circuit 60 detects a voltage output from the step-down chopper circuit 32, and determines whether or not the high-pressure discharge lamp 2 is in an abnormal lighting state (step S51). If the high-pressure discharge lamp 2 is in a normal lighting state, the high-pressure discharge lamp 2 is ignited (return to step S44) and operation continues.

In contrast, where an abnormal lighting state of the high-pressure discharge lamp 2, is determined, the comparison circuit 62 compares an abnormal time period 78 to a predetermined time period (step S52), and if the abnormal time period 78 does not exceed the predetermined time period, the ignition voltage generating circuit 4 repeats an ignition operation again to apply a high-voltage ignition pulse to the lamp 2 (return to step S42). On the contrary, if the abnormal time period exceeds the predetermined time period, operation of the ignition voltage generating circuit 4 is terminated (step S53).

According to the embodiment described above, generation of abnormal discharge can be prevented by terminating a repeated high-voltage ignition pulse at the end-of-life stage of the high-pressure discharge lamp 2, whereby safety can be enhanced. In other words, it is made possible to safely terminate a lamp ballast from operating at the end-of-life stage of the high-pressure discharge lamp 2 or in other similar cases.

Figure 14A:
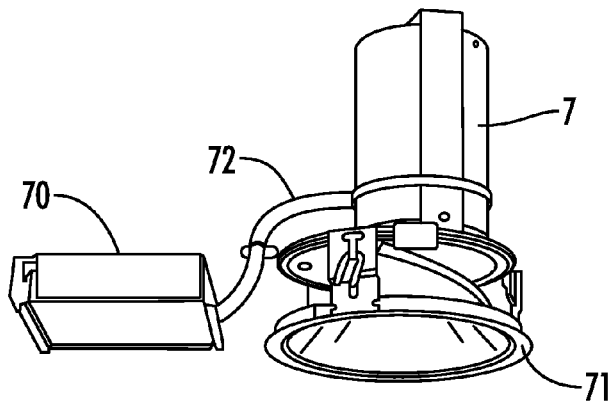
FIG. 14a is an external perspective view of one embodiment of a recessed fixture according to the present invention.
Figure 14B:
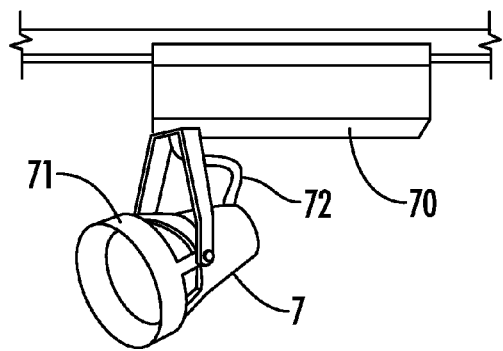
FIG. 14b is an external perspective view of one embodiment of a downlight fixture according to the present invention.
Figure 15:
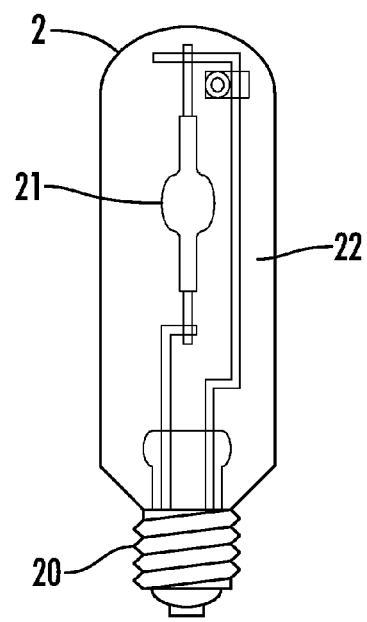
FIG. 15 is an external view of a high-pressure discharge lamp as previously known in the art.
Figure 14C:
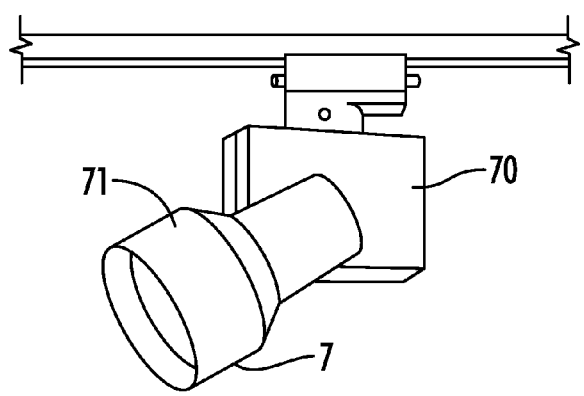
FIG. 14c is an external perspective view of one embodiment of a track light fixture according to the present invention.

Referring now to FIG. 14, a lighting fixture 7 may include various embodiments of the high pressure discharge lamp ballast 1. FIGS. 14a and 14b and 14c show recessed, downlight and track light configuration examples of the lighting fixture 7, including the high-pressure discharge lamp 2 with power supplied from the lamp ballast 1, an electronic ballast housing 70 for storing a circuit of the lamp ballast 1, a fixture main body 71 for mounting the high pressure discharge lamp ballast 1, and a cable 72 for connecting between the high pressure discharge lamp ballast 1 and the high-pressure discharge lamp 2.

Various illumination systems may also be constructed by a plurality of the lighting fixtures 7 and a control device (not shown in the drawing) for controlling these lighting fixtures 7. An illumination system may also be constructed by these lighting fixtures 7 in combination with an illumination sensor, a human sensor and a dimmer for providing a lighting control signal in accordance with a manual output from a dimming control operation circuit.

Thus, although there have been described particular embodiments of the present invention of a new and useful Electronic Ballast for Restarting High-Pressure Discharge Lamps in Various States of Operation, it is not intended that such references be construed as limitations upon the scope of this invention except as set forth in the following claims.

What is claimed is:

1. A high pressure discharge lamp ballast comprising:
a power supply circuit configured to supply AC power to a high-pressure discharge lamp;
an ignition voltage generating circuit configured to supply a high-voltage ignition pulse to the lamp for igniting the lamp;
a pulse control circuit configured to alternatively control the ignition voltage generating circuit in a first control mode to continuously repeat the high-voltage ignition pulse for a first time period and in a second control mode to delay repeating of the high-voltage ignition pulse for a second time period;
an abnormality detection circuit configured to detect an abnormal lighting state of the lamp, wherein a measured condition of the lamp corresponds to a predetermined condition, and
wherein the pulse control circuit adjusts a ratio of the second time period relative to the first time period upon detection of an abnormal lighting state of the lamp by the abnormality detection circuit.

2. The lamp ballast of claim 1, wherein the pulse control circuit makes the ratio of time larger than that obtained before the detection of the abnormal lighting state.

3. The lamp ballast of claim 2, wherein the pulse control circuit makes the ratio of time larger than that obtained before the detection of the abnormal lighting state by making the first time period shorter.

4. The lamp ballast of claim 2, wherein the pulse control circuit makes the ratio of time larger than that obtained before the detection of the abnormal lighting state by making the second time period longer.

5. The lamp ballast according to claim 4, wherein the second time period obtained after adjusting the ratio of time is longer than a time period required to reignite the lamp from an extinguished state after having previously achieved steady-state lighting.

6. The lamp ballast of claim 1, wherein the abnormality detection circuit detects an abnormal lighting state of the lamp by detecting a half-wave discharge.

7. The lamp ballast of claim 1, wherein the abnormality detection circuit detects an abnormal lighting state of the lamp by detecting an interruption state wherein the lamp has been extinguished after having previously achieved a normal lighting state.

8. The lamp ballast of claim 1, wherein the abnormality detection circuit detects an abnormal lighting state of the lamp by detecting an unlit state of the lamp.

9. The lamp ballast of claim 1, wherein the pulse control circuit terminates operation of the ignition voltage generating circuit upon a second detection of an abnormal lighting state by the abnormality detection circuit after making the ratio of time larger than that obtained before a first detection of an abnormal lighting state.

10. An electronic ballast comprising:
   a pulse control circuit configured during lamp ignition to alternately operate in a first control mode to provide a repeated high-voltage ignition pulse to a lamp for a first time period and in a second control mode to delay providing of the high-voltage ignition pulse to the lamp for a second time period; and
   an abnormality detection circuit configured to detect an abnormal lighting state of the lamp, wherein a measured condition of the lamp corresponds to a predetermined condition,
   wherein the pulse control circuit increases a ratio of the second time period relative to the first time period by increasing the second time period upon detection of an abnormal lighting state of the lamp by the abnormality detection circuit.

11. The ballast of claim 10, the abnormality detection circuit further configured to compare a measured abnormality time period to a predetermined time period, wherein if the measured abnormality time does not exceed the predetermined time period the ratio is not increased by the pulse control circuit, and wherein if the measured abnormality time does exceed the predetermined time period the ratio is increased by the pulse control circuit.

12. The ballast of claim 11, wherein if the measured abnormality time does exceed the predetermined time the abnormality detection circuit is further configured to reset the measured abnormality time to zero prior to the ratio being increased by the pulse control circuit.

13. The ballast of claim 12, wherein the second time period is adjusted to be longer than a time period required to reignite the lamp from an extinguished state after having previously achieved steady-state lighting.

14. The ballast of claim 10, the abnormality detection circuit further configured to compare a measured number of abnormalities to a predetermined number of abnormalities, wherein if the measured number does not exceed the predetermined number the ratio is not increased by the pulse control circuit, and wherein if the measured number of abnormalities does exceed the predetermined number of abnormalities the ratio is increased by the pulse control circuit.

15. The ballast of claim 14, wherein if the measured number of abnormalities does exceed the predetermined number the abnormality detection circuit is further configured to reset the measured number of abnormalities to zero prior to the ratio being increased by the pulse control circuit.

16. The ballast of claim 10, wherein the abnormality detection circuit detects an abnormal lighting state of the lamp by detecting half-wave discharge.

17. The lamp ballast of claim 10, wherein the abnormality detection circuit detects an abnormal lighting state of the lamp by detecting an interruption state wherein the lamp has been extinguished after having previously achieved a normal lighting state.

18. The lamp ballast of claim 10, wherein the abnormality detection circuit detects an abnormal lighting state of the lamp by detecting an unlit state of the lamp.

19. The lamp ballast of claim 10, wherein the pulse control circuit terminates operation of the ignition voltage generating circuit upon a second detection of an abnormal lighting state by the abnormality detection circuit after making the ratio of time larger than that obtained before a first detection of an abnormal lighting state.

20. A method of operating an electronic ballast to power a high-pressure discharge lamp, the ballast comprising a power supply circuit effective to controllably provide an AC power to the lamp, an ignition pulse generating circuit effective to controllably provide a high-voltage pulse to ignite the lamp, an abnormality detection circuit, and a control circuit, the method comprising:
   (a) receiving input power at the power supply circuit;
   (b) providing an AC signal from the power supply circuit to the ignition pulse generating circuit in accordance with a first control mode wherein a high-voltage pulse is repeatedly generated and provided to the lamp for a first time period, and with a second control mode wherein the high-voltage pulse is delayed for a second time period;
   (c) measuring the AC signal from the power supply circuit;
   (d) detecting an abnormal lighting state of the lamp based on the measured AC signal;
   (e) adjusting a ratio of the second time period relative to the first time period; and
   (f) repeating steps (b)-(e).

21. The method of claim 20, step (d) further comprising the steps of:
   detecting an abnormal lighting state of the lamp based on the measured AC signal;
   measuring an abnormal time period; and
   comparing the abnormal time period to a predetermined time period, wherein if the abnormal time period exceeds the predetermined time period the process continues to step (e), and wherein if the abnormal time period does not exceed the predetermined time period the process returns to step (b).

22. The method of claim 20, further comprising comparing the abnormal time period to a predetermined time period, wherein if the abnormal time period exceeds the predetermined time period the process is terminated.

* * * * *